(12) United States Patent
Rouge et al.

(10) Patent No.: US 6,270,556 B1
(45) Date of Patent: Aug. 7, 2001

(54) PSA OR VSA UNIT HAVING JOINTLY-CONTROLLED PRODUCTION OUTPUT AND PRODUCTION PRESSURE

(75) Inventors: Dominique Rouge, Malakoff; Nathalie Teuscher, Paris, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/422,331

(22) Filed: Oct. 21, 1999

(30) Foreign Application Priority Data

Nov. 9, 1998 (FR) .................................................. 98 14069

(51) Int. Cl.⁷ .................................................. B01D 53/047
(52) U.S. Cl. ........................ 95/22; 95/23; 95/96; 95/102; 95/130
(58) Field of Search .................................. 95/11, 22, 23, 95/96–98, 100–105, 130, 138

(56) References Cited

U.S. PATENT DOCUMENTS

| 3,703,068 | * | 11/1972 | Wagner | 95/11 |
| 4,197,095 | * | 4/1980 | White, Jr. et al. | 95/23 X |
| 4,323,370 | * | 4/1982 | Leitgeb | 95/103 X |
| 4,472,177 | * | 9/1984 | Sircar | 95/11 |
| 4,516,424 | * | 5/1985 | Rowland | 95/11 X |
| 4,561,287 | * | 12/1985 | Rowland | 95/11 |
| 4,693,730 | * | 9/1987 | Miller et al. | 95/96 X |
| 4,717,396 | * | 1/1988 | Stengle et al. | 95/96 X |
| 4,927,434 | * | 5/1990 | Cordes et al. | 95/98 X |
| 5,108,467 | * | 4/1992 | Schroter et al. | 95/103 |
| 5,529,607 | * | 6/1996 | Tan | 95/100 X |
| 5,858,063 | * | 1/1999 | Cao et al. | 95/98 X |
| 5,876,485 | * | 8/1999 | Andreani | 95/23 |
| 5,917,135 | * | 6/1999 | Michaels et al. | 95/11 |
| 6,090,185 | * | 7/2000 | Monereau et al. | 95/102 |
| 6,146,447 | * | 11/2000 | Sircar et al. | 95/101 |

FOREIGN PATENT DOCUMENTS

| 3006836 | * | 9/1981 | (DE) | 95/11 |
| 0 375 220 | | 6/1990 | (EP) . | |
| 0 821 992 | | 2/1998 | (EP) . | |
| 2 259 871 | | 3/1993 | (GB) . | |
| 57-071804 | * | 5/1982 | (JP) | 95/23 |
| 62-065716 | * | 3/1987 | (JP) | 95/23 |
| 5-277322 | * | 10/1993 | (JP) | 95/23 |
| 0929178 | * | 5/1982 | (SU) | 95/23 |

* cited by examiner

Primary Examiner—Robert H. Spitzer
(74) Attorney, Agent, or Firm—Young & Thompson

(57) ABSTRACT

The invention relates to a process for controlling a PSA, especially VSA, plant for separating a gas stream, in particular a gas stream containing nitrogen and at least one less polar gaseous component, especially oxygen and/or hydrogen. The PSA plant operates in a production cycle and has one or more adsorbers, each production cycle comprising at least one feed step of feed duration (TA), which comprises introducing the gas stream to be separated into an adsorber; at least one production step, which comprises recovering a stream of gas produced at a prefixed production pressure (PP) and with a prefixed nominal production output (DN); and at least one pumping step of pumping duration (TP); which comprises extracting a gas stream from at least one adsorber. According to this control process, the total feed duration (TA) and the total pumping duration (TP) are jointly adjusted in order to maintain, downstream of the PSA plant, a constant production pressure (PP) and to minimize the energy consumption whether the actual production output (DR) is less than or equal to a nominal production output (DN).

11 Claims, 5 Drawing Sheets

PSA OR VSA UNIT HAVING JOINTLY-CONTROLLED PRODUCTION OUTPUT AND PRODUCTION PRESSURE

FIELD OF THE INVENTION

The invention relates to a process of the PSA type, and more particularly of the VSA type, for separating a gas stream, in particular a gas stream containing essentially oxygen and nitrogen, such as air, the production output and the production pressure of which are variable and adjustable over time.

BACKGROUND OF THE INVENTION

The gases in air, such as especially oxygen and nitrogen, are of great industrial importance, especially in the fields of papermaking or glassmaking.

One of the non-cryogenic techniques used for producing these gases is the technique called "PSA" (standing for Pressure Swing Adsorption), which technique covers not only the strictly speaking PSA processes, but also the similar processes such as the VSA (Vacuum Swing Adsorption) and the MPSA (Mixed Pressure Swing Adsorption) processes.

According to this PSA technique, when the gas mixture to be separated is air and the component to be recovered is oxygen, the oxygen is separated from the gas mixture by means of preferential adsorption of at least the nitrogen on a material preferentially adsorbing at least nitrogen and subjected to given pressure cycles in the separation zone.

The oxygen, not being adsorbed or only slightly so, is recovered as output from the separation zone; in general, this has a purity greater than 90%, or even greater than 93%.

More generally, a PSA process for the non-cryogenic separation of a gas mixture comprising a first component that is preferentially adsorbed on an adsorbent material and a second component less preferentially adsorbed on the adsorbent material than the first component, for the purpose of producing the second component, comprises, in a cyclic manner:

- a step of preferential adsorption of at least the first component on the adsorbent material at an adsorption pressure called "high pressure", with recovery of at least some of the second component thus produced;
- a step of desorption of the first component, thus trapped by the adsorbent, at a desorption pressure below the adsorption pressure, called "low pressure";
- a step of recompression of the separation zone comprising the adsorbent, by going from the low pressure to the high pressure.

However, it is known that the efficiency of separation of a gas mixture, such as air, depends on many parameters, especially the high pressure, the low pressure, the type of adsorbent material used and the affinity of the latter for the components to be separated, the composition of the gas mixture to be separated, the adsorption temperature of the mixture to be separated, the size of the adsorbent particles, the composition of these particles and the temperature gradient established inside the bed of adsorbent.

Currently, zeolites are the adsorbents most used in PSA processes. The zeolite particles usually contain monovalent, divalent and/or trivalent metal cations, for example cations of alkali metals, alkaline-earth metals, transition metals and/or lanthanides, these cations being incorporated during the synthesis of the zeolite particles and/or inserted subsequently using an ion-exchange technique, that is to say, in general, by bringing the unexchanged or raw zeolite particles into contact with a solution of one or more metal salts comprising the cation or cations to be incorporated into the zeolitic structure and subsequently recovering the particles of exchanged zeolite, that is to say of zeolite containing a given amount of metal cations. By way of example, mention may be made of zeolites of type X or LSX (Low Silica X) containing more than 80%, or even more than 90%, of metal cations such as, especially, lithium, calcium and/or zinc cations.

Such zeolites are especially described in documents EP-A-486,384, EP-A-606,848, EP-A-589,391, EP-A-589,406, EP-A-548,755, EP-A-109,063 and EP-A-760,248.

However, a recurrent concern in gas production using the PSA process, and in particular the VSA process, is to be able to offer the customer or the site using the gas produced, such as a combustion furnace for example, various combinations of production output and production pressure depending on the requirements and/or needs specific to this customer or this user site, and to do so by means of a standard PSA, particularly VSA, apparatus or unit installed on the site.

In other words, to be able, beyond a chosen nominal operating point of the PSA unit, to optimally adapt to the fluctuations in demand by the customer or the user site, so as to guarantee acceptable performance and an acceptable production cost from an industrial standpoint, despite the fluctuations in demand.

To do this, it is common practice to control the PSA or VSA unit so as to be able to obtain the combinations of production output and production pressure that are desired by the customer.

There is considerable teaching in the prior art concerning the control of PSA, particularly VSA, processes which make it possible to respond, at a given industrial unit, to changes in production gas consumption without inordinately affecting the overall energy consumption of the process.

Thus, a first known type of control is based on the introduction of a dead time, of constant or variable duration, into the production cycle, as described especially in documents EP-A-458,350 and EP-A-819,463.

During this dead time, the adsorbers are isolated, the machines operating with no load, and the intended objective is therefore to improve the energy consumption which, in the absence of this dead time, would be degraded in direct proportion to the reduction in the output consumed.

However, it turns out that this type of control allows specific energy degradation during reduced operation of the PSA, particularly VSA, unit to be limited only very partially. Thus, for a production of 50% of the nominal output of a VSA unit, the specific energy is degraded by more than 30% compared with the nominal value.

Furthermore, for batch production processes, especially in the case of a VSA unit having one or two adsorbers, there is necessarily a reduction in the pressure of the production gas output by the VSA, which must be compensated for by additional compression downstream of the unit.

In other words, the pressure variation DP in the production capacity is, for batch production units, for example of the MPSA type, such that:

$$DP = \frac{DP_0 \cdot (T_c - d) \cdot (T_c + Y)}{T_0 \cdot (T_0 - d + Y)}$$

where:
- $DP_0$ is the difference between the extreme pressures in nominal operation;
- $T_c$ is the cycle time or duration (in seconds)
- $d$ is the time (in seconds) during which there is no production; and Y is the duration (in seconds) of the reduced-operation dead time.

In other words, in most cases, this type of control with introduction of dead time may not be sufficient by itself to maintain a perfectly constant service, especially for a fixed purity and a fixed pressure of the oxygen produced and whatever the output consumed, and therefore assumes that a second control be carried out downstream of the PSA or VSA unit, for example by means of a compressor.

An alternative solution involves decreasing the feed rate of the PSA or VSA unit, that is to say reducing the amount of material injected into the system during the adsorption phase of the sieve bed.

This may be achieved either by modifying the feed duration, as described by documents FR 97/16086 or U.S. Pat. No. 4,539,019, or by adjusting the aperture of an adsorber recompression valve, as recommended by document U.S. Pat. No. 5,258,056.

Although this solution is quite often preferable to the previous one in terms of energy consumption, given that it makes it possible, in certain cases, to maintain a constant specific energy up to 85% of the nominal output, as described by FR 97/16086, it does have in particular the disadvantage of leading to an obligatory reduction in the pressure of the production gas since the high pressure of the pressure cycle is necessarily lowered.

In addition, as in the case of the first control method, this second solution may not be sufficient to maintain a constant service. This is because it has been found that reduced operation, for example at 85% of the nominal output, leads to a drop in production pressure of 12,000 Pa.

Other documents recommend, conversely, specifically controlling the low pressure by modifying the gas streams during the cycle. In this regard, mention may be made of document EP-A-0,689,862.

However, the latter solution is quite complex to implement and often requires additional control means, compared with the previous variants, and, moreover, for units with positive-displacement machines, results in a modification to the high pressure of the cycle and therefore to the production pressure.

Furthermore, it seems that no system or process for controlling a PSA or VSA unit allowing the pressure of the gas delivered to be marginally adjusted, either in order to follow an occasional fluctuation in the needs of the customer or the consumer site, or in order to meet various minimum production pressure requirements, for example for various applications of the gas thus produced, with a single range of standard units, has hitherto been described.

SUMMARY OF THE INVENTION

The present invention therefore aims to propose a method of finer control of PSA, particularly VSA, units whatever they are, that is to say having one or several adsorbers, when the needs of the customer or of the consumer site for the gas produced change in terms of output and/or pressure.

In particular, the object of the present invention is to allow control of the PSA or VSA unit, which permits reduced operation with optimized specific energy without the production pressure being modified, that is to say without redundant output/pressure control downstream of the PSA or VSA unit.

The subject of the present invention is therefore a process for controlling a PSA plant for separating a gas stream operating in a production cycle and having at least one adsorber, each production cycle comprising the following steps:

at least one feed step of feed duration (TA), which comprises at least one introduction of the gas stream to be separated into at least one adsorber;

at least one production step, which comprises at least one recovery of a stream of gas produced at a prefixed production pressure (PP) and with a prefixed nominal production output (DN); and at least one pumping step of pumping duration (TP), which comprises at least one extraction of a gas stream from at least one adsorber;

and in which the feed duration (TA) and the pumping duration (TP) are jointly adjusted in order to maintain, downstream of the PSA plant, and approximately constant production pressure (PP) and thus to minimize the energy consumption, for at least an actual production output (DR) of less than or equal to a nominal production output (DN), preferably for any actual production output (DR) less than or equal to a nominal production output (DN).

The expression "production pressure (PP) downstream of the PSA plant" should be understood to mean the minimum pressure obtained either directly on the output side of the at least one adsorber or on the output side of at least one production buffer tank located downstream and connected to the at least one adsorber.

In other words, the present invention relates to a process for controlling a PSA or VSA plant, in which there is joint control of the effective feed duration (TA) and the effective pumping duration (TP), this control being based on:

on the one hand, a setting of the nominal durations $TA_0$ and $TP_0$ so as to obtain a set production output/pressure/purity combination; and on the other hand, a control of the TA/TP pair so as to maintain, particularly under the best economic conditions, the purity/pressure pair for any output of gas consumed or actual output (DR) less than or equal to a nominal gas output (DN).

Within the context of the invention, the following terms are used:

TA: the feed duration, that is to say the time during which the gas mixture to be treated is brought into contact with a bed of adsorbent;

TB: the pumping duration, that is to say the time during which the residual gas is removed from the adsorbent bed;

DN: the nominal output of the unit;

PP: the minimum pressure of the production gas;

PG: the purity of the production gas;

the indices 0 indicate the values taken by these variables under the initial setting conditions of the PSA unit.

Within the context of the invention, the setting of the initial operation of the PSA unit, that is to say the ($TA_0$, $TP_0$) pair, is made when the unit is brought into commission.

In the case of units having a single adsorber, the setting of the feed-step and pumping-step durations may be done independently.

On the other hand, for PSA plants having at least two adsorbers, which must adhere to a certain correspondence of steps, it may be necessary to insert, into one or other of the feed or pumping steps, a specific dead time which then modifies the effective duration of the step.

Depending on the case, the process of the invention may include one or more of the following characteristics:

the effective feed duration (TA) is controlled as a function of the actual production pressure (PP) and the ratio (TP/TA) of the effective pumping duration to the effective feed duration is controlled as a function of the ratio (DR/DN) of the actual production output to the nominal production output;

the effective pumping duration (TP) is furthermore controlled so as to maintain a set purity (PG) of the gas produced;

during the feed step of initial feed duration ($TA_0$), at least a first dead time of a first dead time duration (X) is introduced such that the actual feed duration (TA) is equal to $TA_0-X$;

during the pumping step of initial pumping duration ($TP_0$), at least a second dead time of a second dead time duration (Y) is introduced so that the effective pumping duration (TP) is equal to $TP_0-Y$;

a third dead time having a third dead time duration (Z) is optionally introduced into each cycle;

the feed duration (TA) is between 5 and 60 seconds, preferably between 10 and 40 seconds;

the pumping duration (TP) is between 5 and 60 seconds, preferably between 10 and 40 seconds;

the prefixed production pressure (PP) is between $10^5$ and $10^7$ Pa, preferably between $10^5$ and $10^6$ Pa;

the gas stream to be separated comprises nitrogen and at least one less polar gaseous component, especially oxygen and/or hydrogen, and preferably the gas stream is air, the first gaseous component being nitrogen and the second gaseous component being oxygen, the air being, within the context of the present invention, the air contained inside a building or a heated or unheated enclosure, or the outside air, that is to say under atmospheric conditions, taken as it is or optionally pretreated;

the first gaseous component is nitrogen and the second gaseous component is oxygen, and an oxygen-rich gas stream, that is to say comprising in general at least 90% oxygen, is produced;

the high adsorption pressure is between $10^5$ Pa and $10^7$ Pa, preferably about $10^5$ Pa to $10^6$ Pa, and/or the low desorption pressure is between $10^4$ Pa and $10^6$ Pa, preferably about $10^4$ Pa to $10^5$ Pa;

the feed temperature is between 10° C. and 80° C., preferably between 25° C. and 60° C.

Preferably, the PSA unit has from 1 to 3 adsorbers and/or is of the radial-flow type and/or is of the VSA (Vacuum Swing Adsorption) type and/or employs one or more adsorbents, for example a multibed process.

BRIEF DESCRIPTION OF THE DRAWINGS

The invention will now be described in greater detail with the aid of examples given by way of illustration, but implying no limitation, with reference to the appended figures.

DETAILED DESCRIPTION OF THE INVENTION

Figure 1A:
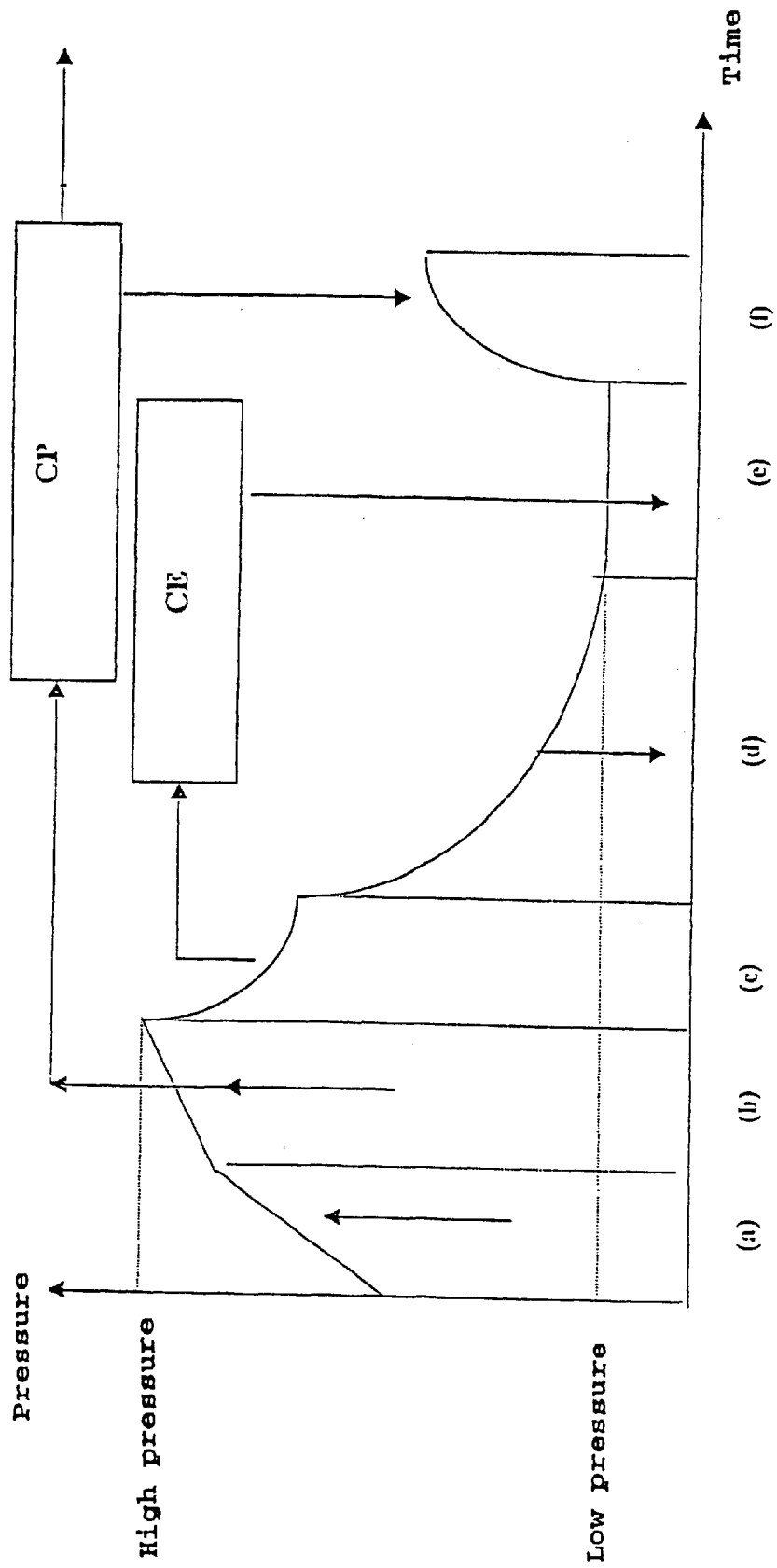
FIGS. 1a and 1b show diagrams illustrating the operation of a PSA unit having a single adsorber to produce oxygen from air.
Figure 1B:
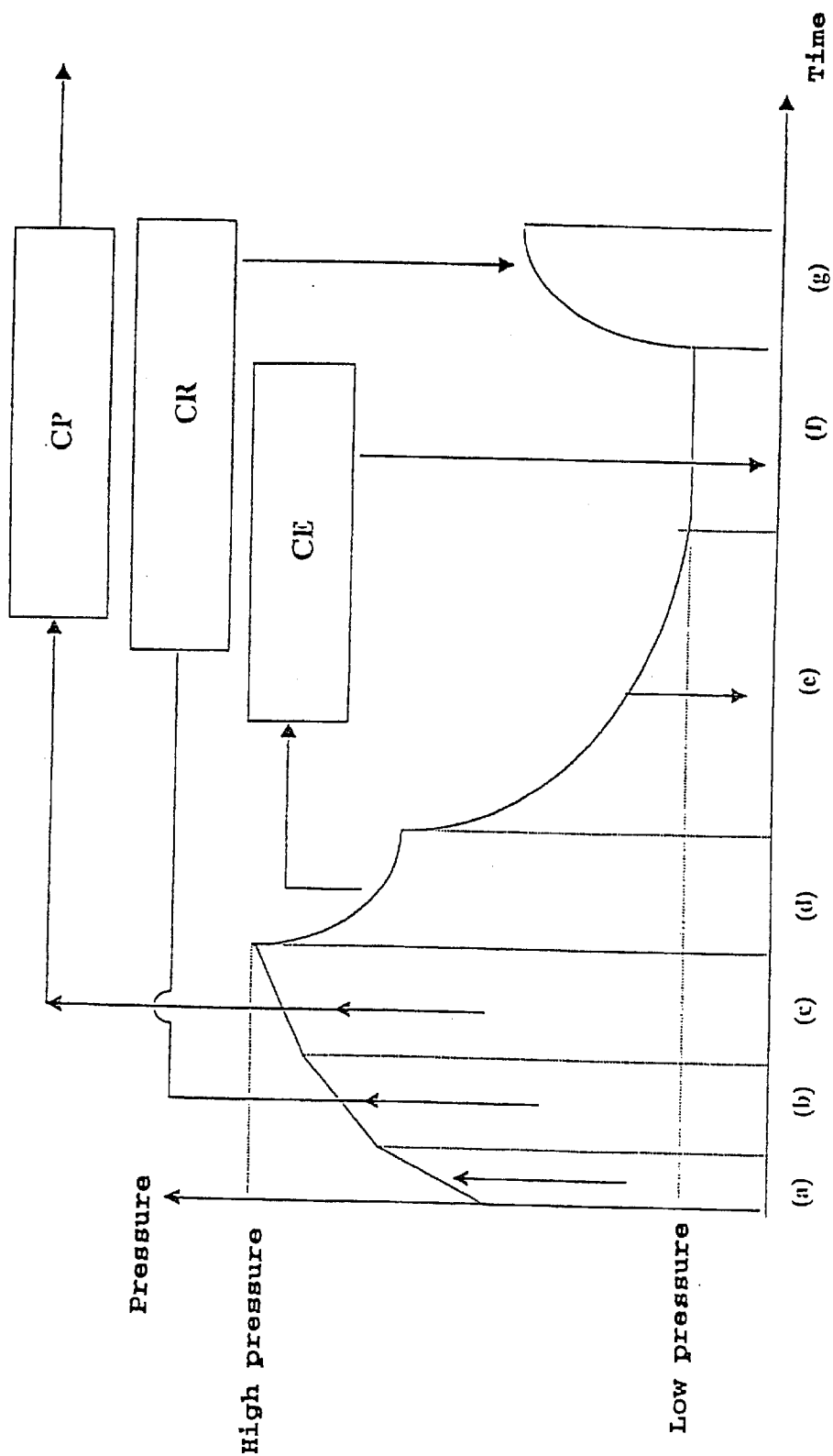

FIGS. 1a and 1b show diagrams illustrating the operation of a PSA unit having a single adsorber, or monoadsorber unit, used to produce oxygen from air by preferential adsorption of nitrogen molecules on a suitable adsorbent, for example a faujasite-type zeolite exchanged to at least 86% with lithium or calcium cations.

This monoadsorber unit is a VSA unit of the standard type, designed so as to adhere to the operating cycle shown in FIG. 1a or the cycle shown in FIG. 1b, depending on the requirements.

More specifically, the cycle in FIG. 1a comprises, schematically, the following steps:

a feed step (a) by itself;

a feed step (b) with simultaneous production to a production tank CP;

a cocurrent balancing step (c), to a balancing tank CE;

a pumping step (d);

an elution step (e), that is to say a step in which gas is withdrawn via the inlet of the adsorbent bed with simultaneous countercurrent introduction of the balancing gas coming from the balancing tank CE;

a countercurrent recompression step (f) by production gas coming from the production tank CP.

The effective feed duration (TA) is the sum of the durations of the first two steps. The effective pumping duration (TP) is the duration of the fourth step or the sum of the durations of the fourth and fifth steps.

Furthermore, as regards the operating cycle shown in FIG. 1b, this comprises, schematically, the following steps:

a feed step (a) by itself;

a feed step (b) with simultaneous recovery of the less easily adsorbed component at the bed outlet directed to a recompression tank CR;

a feed step (c) with simultaneous production to a production tank CP;

a cocurrent balancing step (d), to a balancing tank (CE);

a pumping step (e);

an elution step (f), that is to say a step in which gas is withdrawn via the inlet of the adsorbent bed with simultaneous countercurrent introduction of the balancing gas coming from the balancing tank CE;

a countercurrent recompression step (g) by recompression gas coming from the recompression tank CR.

The effective feed duration (TA) is the sum of the durations of the first three steps. The effective pumping duration (TP) is the duration of the fifth step or the sum of the durations of the fifth and sixth steps.

In fact, for a standard VSA unit, the standard operation of the VSA unit relies on the choice, at the design stage, of standard pressures and durations of the steps as well as of a given volume of production tank.

The standard operation of the VSA unit may subsequently be modified from this in order to achieve other specifications or constraints, especially with regard to production, production pressure or specific energy, and do so by simply adjusting the TA/TP pair.

Figure 2:
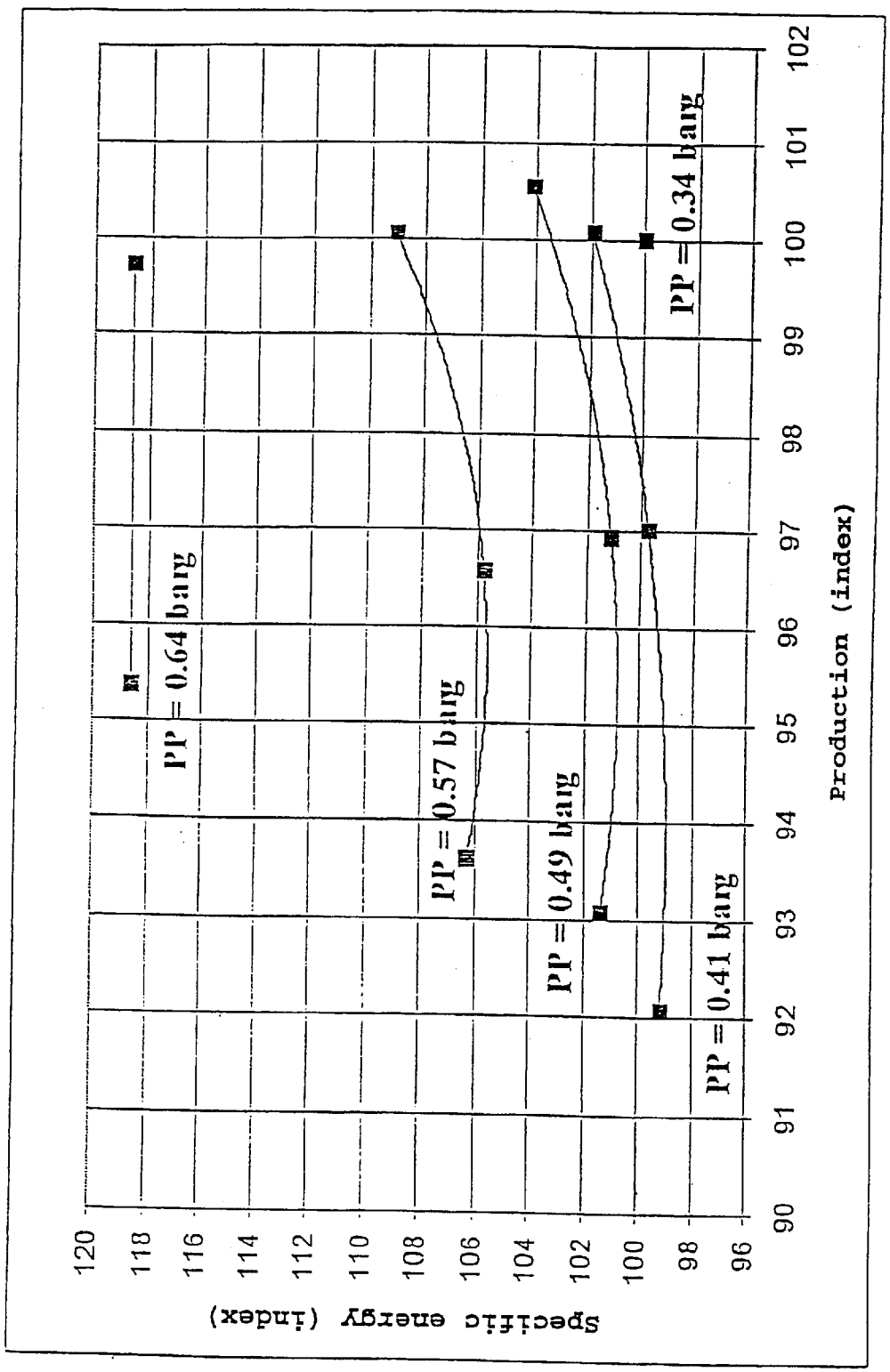
FIG. 2 is a graphical representation depicting the impact of the setting of the minimum production pressure on the performance of the VSA unit.

Thus, FIG. 2 shows what it is possible to achieve by varying a given TA/TP pair.

More specifically, FIG. 2 shows diagrammatically the impact of the setting of the minimum production pressure on the performance of the VSA unit.

Thus, if the standard operation of the VSA unit gives (100; 100; 100) for the (production; production pressure; specific energy) combination, the VSA unit may be set, on site, so as to obtain (97; 111; 101), which is a combination perhaps more economically suited to a specific environment.

As a result, the $TA_0$ and $TP_0$ values obtained for the latter combination may be frozen and recorded as initial values by control means of the plant, for example a controller or numerical control of the VSA unit.

Likewise, the output and pressure thus set may thereafter be the initial output $DN_0$ and initial pressure $PP_0$ of the VSA unit.

On the basis of this specific initial operation, the unit can then be best adapted, in particular economically, to the variations in demand of the customer.

To do this, the VSA plant must then be subjected to a control, for example be controlled as follows:

the effective feed duration TA is controlled with respect to the production pressure setting $PP_0$, for example using a linear control function of the type:

$$TA_n = TA_{n-1} \times \left(1 + a \times 1 - \left(\frac{PP_n}{PP_0}\right)\right)$$

where:

a>0; n is the number of a given cycle and n−1 is the number of the cycle preceding the given cycle n;

a dead time X, of duration $TA_0$–TA, is introduced into the initial feed step of duration $TA_0$;

the TP/TA ratio is controlled by a function of $DR/DN_0$, determined by experiment or by simulation.

Figure 3:
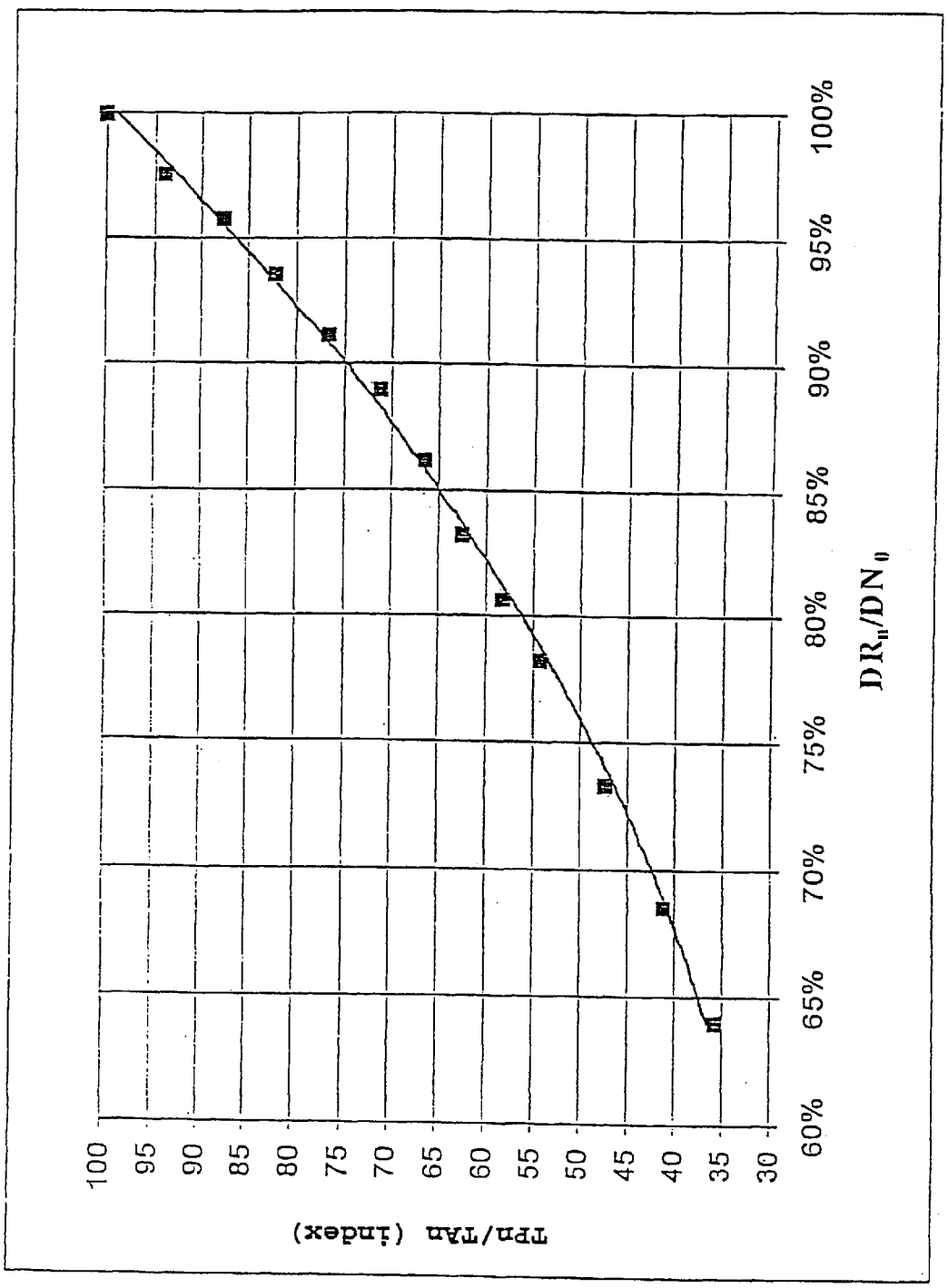
FIG. 3 is a curve depicting the control of the ratio of the effective pumping duration to the effective feed duration as a function of the ratio of the actual production output to the nominal production output for a monoadsorber oxygen-production unit.

Thus, the curve in FIG. 3 shows the form of this function in the case of a monoadsorber oxygen-production unit.

It should be noted that this function may be easily approximated by a linear function f and corrected marginally as a function of the deviation from the set purity. Thus, for example:

$$\frac{TP_n}{TA_n} = \frac{TP_{n-1}}{TA_{n-1}} \times \frac{f\left(\frac{DR_n}{DN_0}\right)}{f\left(\frac{DR_{n-1}}{DN_0}\right)} \times \left(1 \div b \times \left(1 - \frac{PG_n}{PG_0}\right)\right)$$

with b>0 and n the number of the cycle.

Figure 4:
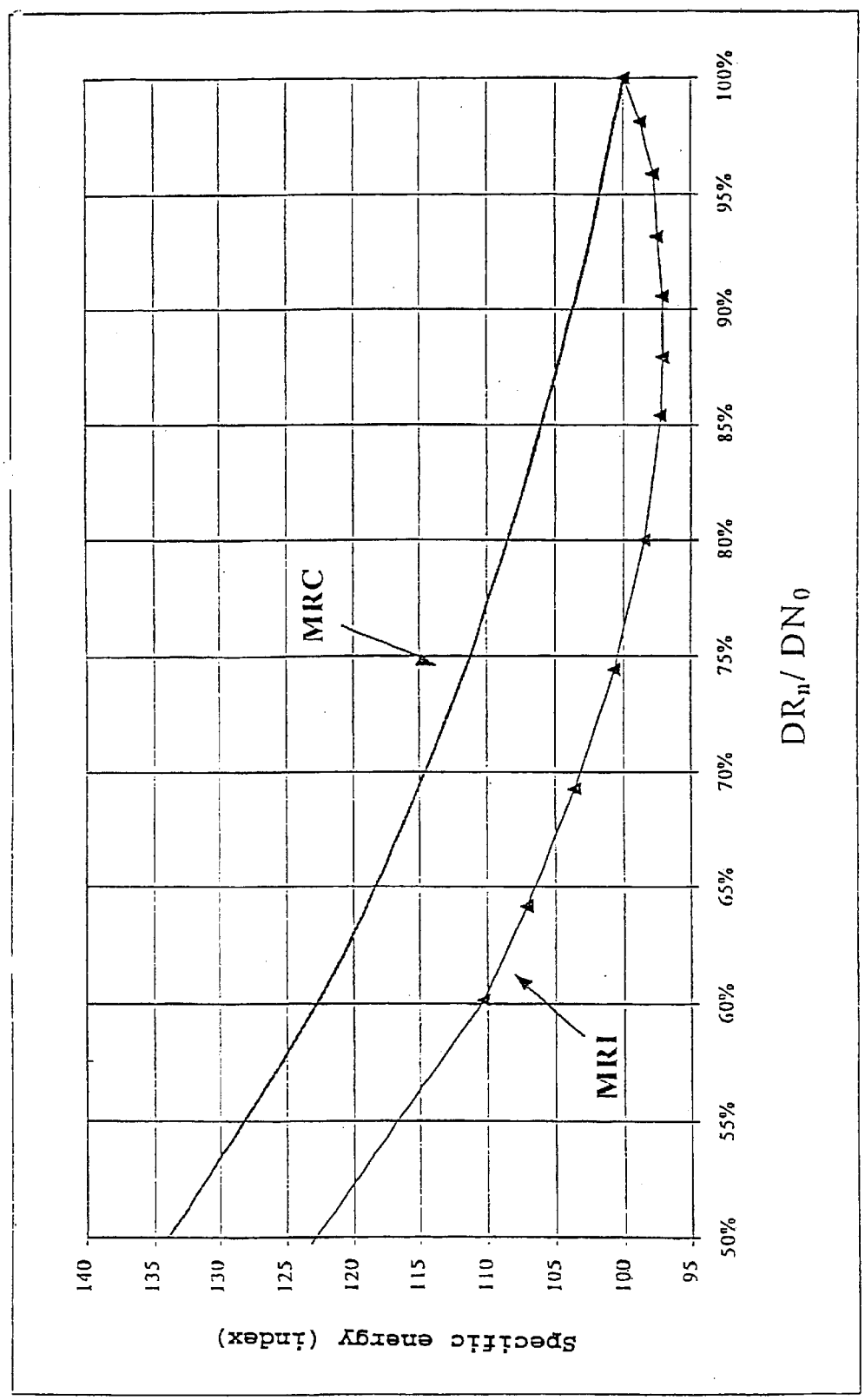
FIG. 4 illustrates the change in specific energy during reduced operation of the VSA unit.

This type of control makes it possible to maintain the production pressure and to optimize the energy consumption in reduced operation, as shown in FIG. 4 which illustrates the change in specific energy during reduced operation of the VSA unit.

As may be seen in FIG. 4, the reduced operation according to the invention (MRI) makes it possible, in addition to maintaining the pressure of the production gas, to keep the specific energy constant over a wide range of outputs consumed and to make a saving of more than 20% in specific energy compared with a conventional reduced operation (MRC) employing only the simple addition of an additional dead time into the operating cycle.

However, it should be noted that there is an output threshold below which the instantaneous variation in specific energy as a function of the output becomes greater with a conventional-type reduced operation.

It may therefore be more advantageous to produce a combination of the two controls, namely, firstly a conventional control up to a predetermined threshold, in this case for example up to about 70% of the nominal output, and then, on the basis of this threshold, the introduction of an additional dead time according to the present invention.

The present invention is not limited to the field of oxygen production from air and can therefore, consequently, be applied to the separation of other gas streams, especially to streams containing hydrogen, carbon dioxide and/or carbon monoxide, in particular to the production of synthesis gas or "syngas".

What is claimed is:

1. Process for controlling a PSA plant for separating a gas stream, operating in a production cycle and having at least one adsorber, each production cycle comprising the following steps:

at least one feed step of feed duration (TA), which comprises at least one introduction of the gas stream to be separated into at least one adsorber;

at least one production step comprising at least one recovery of a stream of gas produced at a prefixed production pressure (PP) and with a prefixed nominal production output (DN); and at least one pumping step of pumping duration (TP), which comprises at least one extraction of a gas stream from at least one adsorber;

and in which the feed duration (TA) and the pumping duration (TP) are jointly adjusted in order to maintain, downstream of said PSA plant, the production pressure (PP) approximately constant for at least one actual production output (DR) of less than or equal to the nominal production output (DN).

2. The process according to claim 1, wherein the feed duration (TA) is controlled as a function of the production pressure (PP) and in that the ratio (TP/TA) of the pumping duration to the feed duration is controlled as a function of the ratio (DR/DN) of the actual production output to the nominal production output.

3. The process according to claim 1, wherein the pumping duration (TP) is furthermore controlled so as to maintain a set purity (PG) of the gas produced.

4. The process according to claim 1, wherein during the feed step of initial feed duration ($TA_0$), at least a first dead time of a first dead time duration (X) is introduced so that the feed duration (TA) is equal to $TA_0$–X.

5. The process according to claim 1, wherein during the pumping step of initial pumping duration ($TP_0$), at least a second dead time of a second dead time duration (Y) is introduced so that the pumping duration (TP) is equal to $TP_0$–Y.

6. The process according to claim 1, wherein at least a third dead time having a third dead time duration (Z) is introduced into each cycle.

7. The process according to claim 1, wherein said at least one adsorber comprises from 1 to 3 adsorbers with radial flow.

8. The process according to claim 1, wherein the plant is a VSA plant.

9. The process according to claim 1, wherein for each production cycle, at least one of the following condition exists:

the feed duration (TA) is between 5 and 60 seconds;

the pumping duration (TP) is between 5 and 60 seconds; and the prefixed production pressure (PP) is between $10^5$ and $10^7$ Pa.

10. The process according to claim 1, wherein for each production cycle, at least one of the following conditions exists:

the feed duration (TA) is between 10 and 40 seconds;

the pumping duration (TP) is between 10 and 40 seconds; and the prefixed production pressure (PP) is between $10^5$ and $10^6$ Pa.

11. The process according to claim 1, wherein the gas stream to be separated comprises nitrogen and/or at least one less polar gaseous component selected from the group consisting of oxygen and hydrogen.

* * * * *